United States Patent
Blinzer (10) Patent No.: US 12,117,933 B2
(45) Date of Patent: Oct. 15, 2024

(54) TECHNIQUES FOR SUPPORTING LARGE FRAME BUFFER APERTURES WITH BETTER SYSTEM COMPATIBILITY

(71) Applicant: Advanced Micro Devices, Inc., Santa Clara, CA (US)

(72) Inventor: Paul Blinzer, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 155 days.

(21) Appl. No.: 17/117,033

(22) Filed: Dec. 9, 2020

(65) Prior Publication Data

US 2022/0179784 A1 Jun. 9, 2022

(51) Int. Cl.
*G06F 12/06* (2006.01)
*G09G 5/36* (2006.01)

(52) U.S. Cl.
CPC ......... *G06F 12/0646* (2013.01); *G09G 5/363* (2013.01); *G06F 2212/1008* (2013.01); *G09G 2360/08* (2013.01); *G09G 2360/18* (2013.01)

(58) Field of Classification Search
CPC .................................................. G06F 12/0646
See application file for complete search history.

(56) References Cited

U.S. PATENT DOCUMENTS

| | | | | |
|---|---|---|---|---|
| 6,411,302 | B1* | 6/2002 | Chiraz | G09G 5/024 345/545 |
| 7,009,618 | B1* | 3/2006 | Brunner | G06F 12/063 345/557 |
| 2003/0188079 | A1* | 10/2003 | Singhal | G06F 11/1076 714/E11.034 |
| 2009/0147015 | A1* | 6/2009 | Etscheid | G09G 5/363 345/566 |
| 2016/0328333 | A1* | 11/2016 | Dong | G06F 9/50 |
| 2017/0220483 | A1* | 8/2017 | Lillibridge | G06F 12/0292 |

* cited by examiner

*Primary Examiner* — Michelle T Bechtold
*Assistant Examiner* — Marwan Ayash
(74) *Attorney, Agent, or Firm* — Volpe Koenig (57) ABSTRACT

A technique for accessing accelerated processing device ("APD") memory is provided. The technique includes identifying whether to activate one or both of a first direct mapping unit and a second direct mapping unit, wherein the first direct mapping unit is associated with a small address size and the second direct mapping unit is associated with a large address size; activating the identified one or both of the first direct mapping unit and the second direct mapping unit; and accessing memory of the accelerated processing device using the one or both of the first direct mapping unit and the second direct mapping unit.

20 Claims, 7 Drawing Sheets

TECHNIQUES FOR SUPPORTING LARGE FRAME BUFFER APERTURES WITH BETTER SYSTEM COMPATIBILITY

BACKGROUND

For graphics processing, central processing units ("CPUs") communicate large amounts of data to graphics processing units ("GPUs"), which then process that data for purposes such as rendering images. Efficient communication of such data is important for operating efficiency.

BRIEF DESCRIPTION OF THE DRAWINGS

A more detailed understanding can be had from the following description, given by way of example in conjunction with the accompanying drawings wherein.

DETAILED DESCRIPTION

A technique for accessing accelerated processing device ("APD") memory is provided. The technique includes identifying whether to activate one or both of a first direct mapping unit and a second direct mapping unit, wherein the first direct mapping unit is associated with a small address size and the second direct mapping unit is associated with a large address size; activating the identified one or both of the first direct mapping unit and the second direct mapping unit; and accessing memory of the accelerated processing device using the one or both of the first direct mapping unit and the second direct mapping unit.

Figure 1:
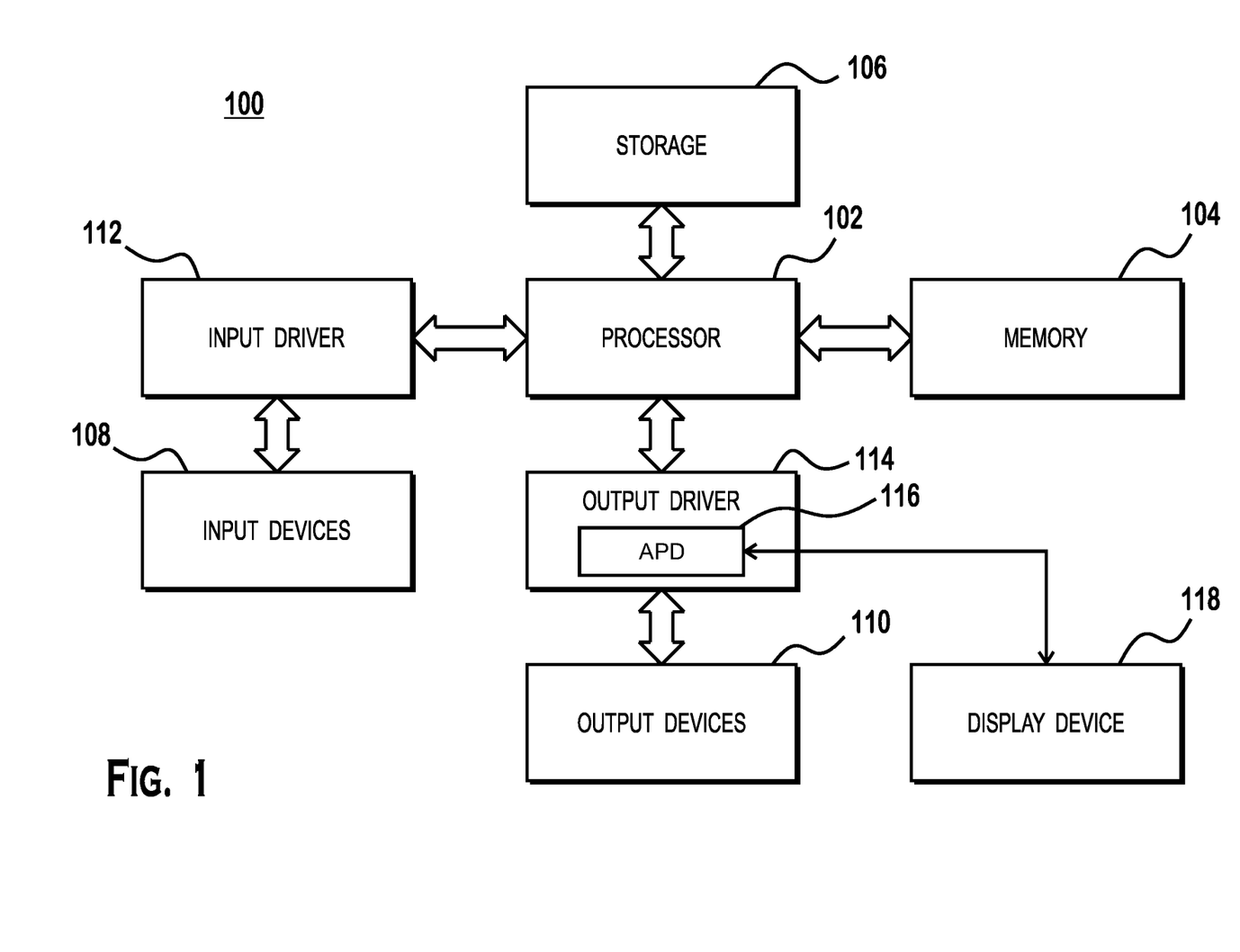
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. The APD 116 includes an APD memory 139, which is memory directly accessible from components within the APD 116, such as the compute units 132. Within the APD 16, the APD memory is accessed via physical memory addresses of a physical APD memory address space that is local to the APD 116. In examples, the physical memory address space of the APD is different than the physical address space of the system memory 104. In various examples, and as described in further detail elsewhere herein, at least some of the physical memory address space of the system memory 104 is mapped to at least a portion of the address space of the APD memory 139.

As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
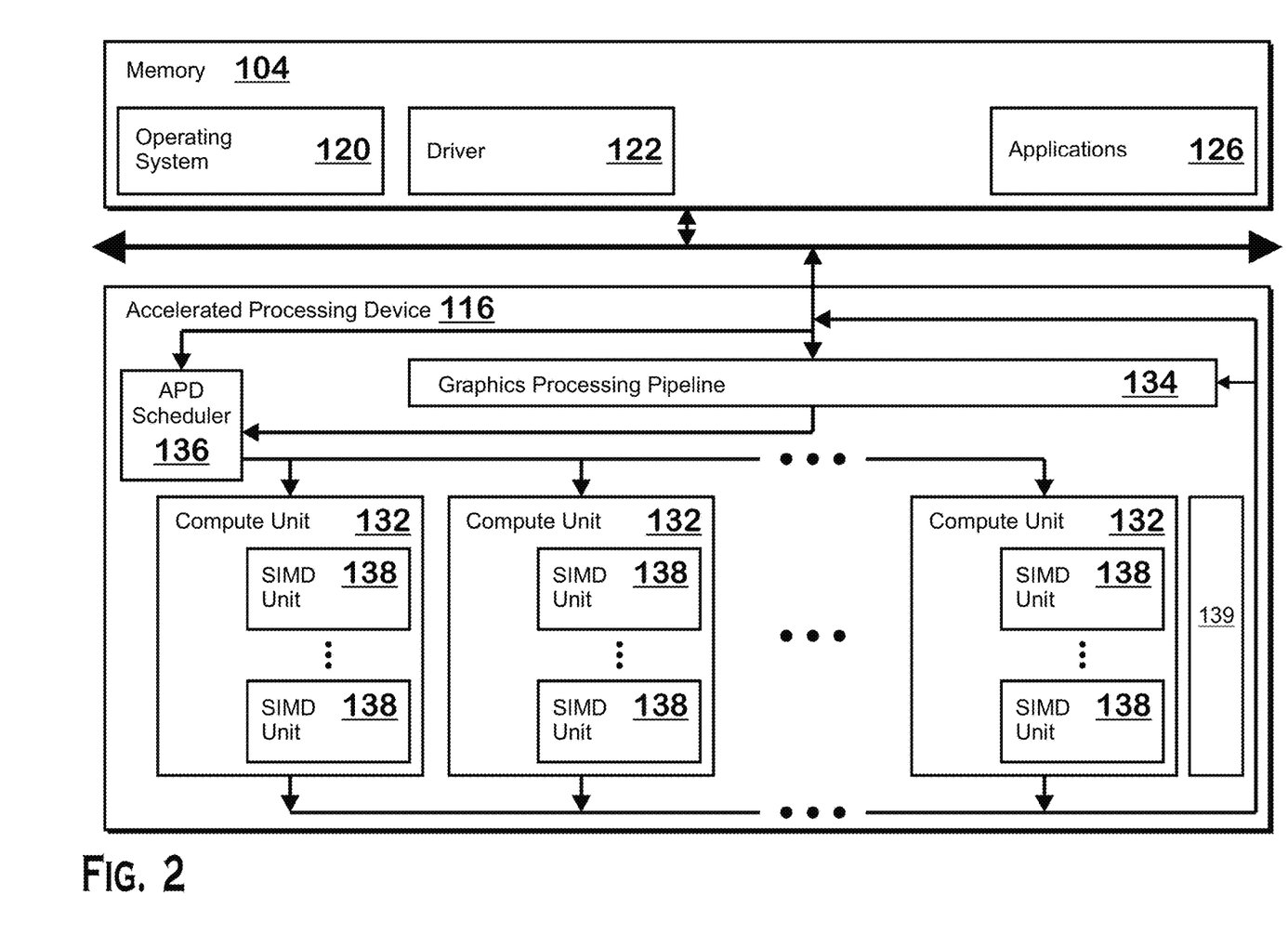
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
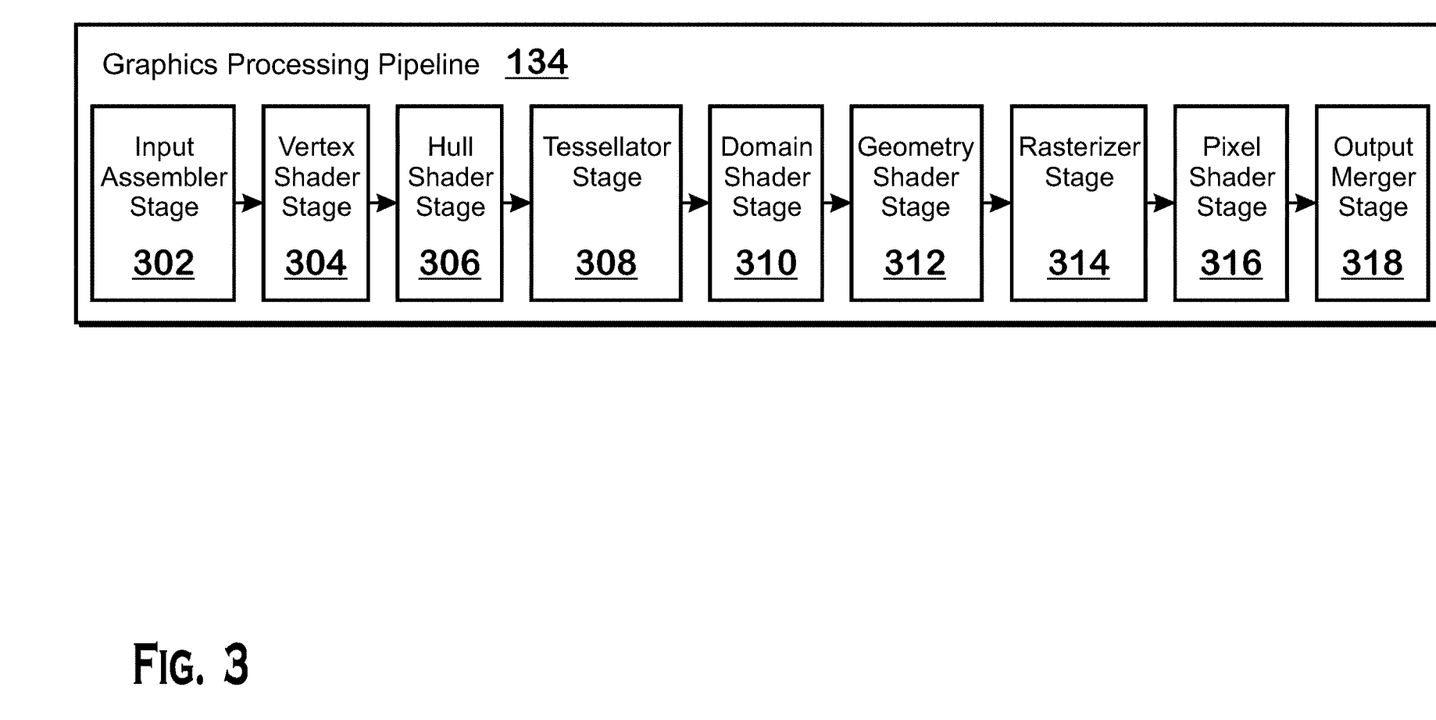
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

Although an implementation of the APD 116 including a graphics processing pipeline 134 is illustrated, it should be understood that implementations of the APD 116 that do not include a graphics processing pipeline, but do include the compute units 132, are contemplated by the present disclosure. In an example, an APD 116 that does not have fixed function graphics-related hardware but that does have programmable hardware that can be programmed to perform non-graphics related functions or even graphics functions, is contemplated.

Figure 4A:
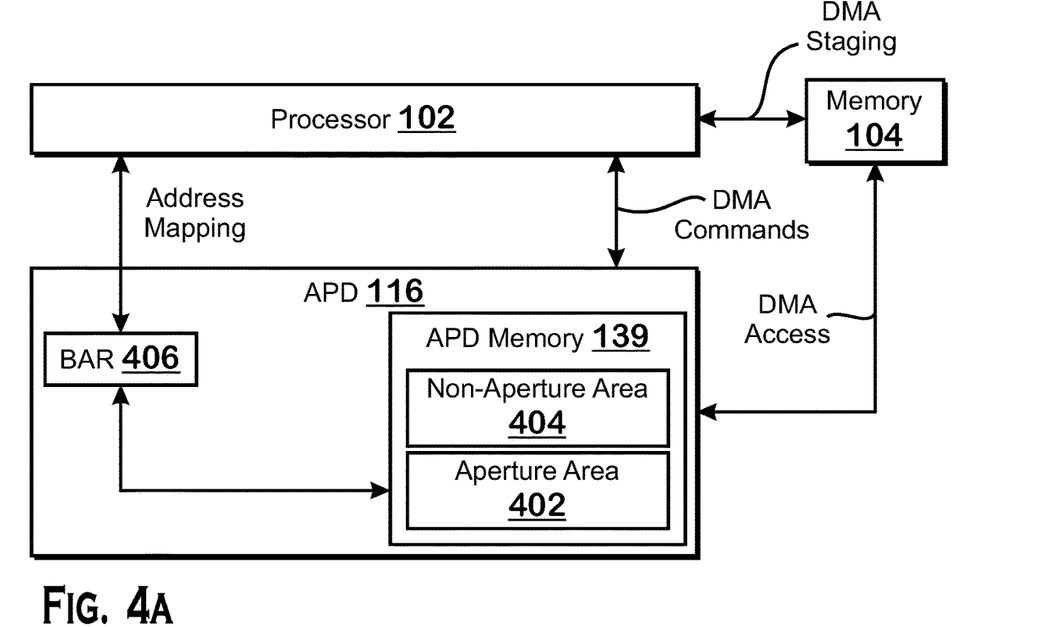
FIGS. 4A-4B illustrates details of communication between the processor and the accelerated processing device, according to example.
Figure 4B:
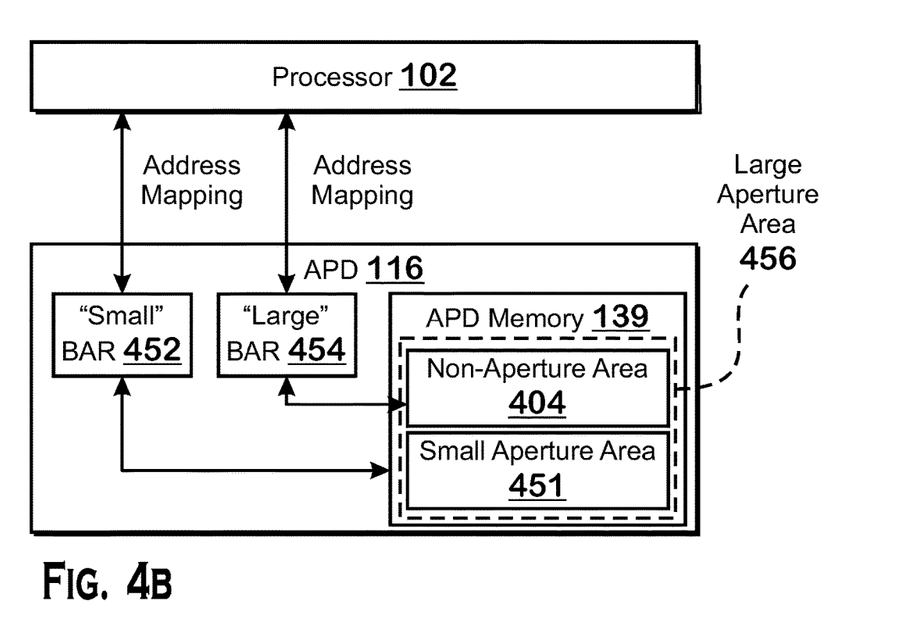

FIGS. 4A-4B illustrates details of communication between the processor 102 and the APD 116, according to example. In FIG. 4A, a processor 102 is shown in communication with an APD 116. The APD 116 includes a base address register ("BAR") 406, which specifies how to map from the address space of the processor 102 (which is the same as the address space of the memory 104) to the address space of the APD memory 139. In an example, the base address register indicates which base address in the processor physical space maps to which base address in the APD 116. Note that although a base address register is described as the mechanism for mapping between address spaces, alternative mechanisms that provide a mapping between the address spaces fall within the scope of the present disclosure. The APD 116 also includes APD memory 139, which includes an aperture area 402 and a non-aperture area 404.

As stated, the base address register 406 provides a mapping between the processor 102 address space and the APD 116 address space. This mapping allows software executing on the processor 102 to directly access the APD memory 139 via reads or writes to memory addresses of the processor address space. More specifically, the processor 102 executes instructions that request accesses (reads or writes) to memory addresses. A memory controller (not shown) associated with the processor 102 detects such accesses, and, upon determining that an address falls within a portion of the processor memory address space that is mapped to the APD memory 139, as defined by the base address register 406, forwards such memory access requests to the APD 116, along with the address specified. A memory controller (not shown) associated with the APD 116 examines such requests, translates the specified memory address to a memory address of the APD address space, and issues commands to the APD memory 139 to perform the access requests. The memory controllers are embodied as hardware circuitry configured to perform the described actions, software executing on a processor configured to perform the described actions, or a combination of hardware and software configured to perform the described actions.

The system in FIG. 4A is limited in such a way that the entire memory of the APD 139 is not directly accessible through reads and writes by the processor 102 as described above. More specifically, at least one component of the system in FIG. 4A operates with an address size that is small enough such that the entire amount of memory in the APD memory 139 is not mappable into the address space of the processor 102. In an example, at least one component, such as at least a portion of an operating system executing on the processor 102, executes in 32 bit mode. With 32 bits available for an address, 4 gigabytes ("GB") are addressable by such an address. However, only a relatively small portion of this 4GB is assigned to be directly mappable between the processor 102 address space and the APD 116 address space. This is because the other portion of the address space is needed for other tasks, such as for accessing memory 104 and accessing other devices or for other uses. In an example, the area of the APD memory 116 that is directly accessible with a 32 bit address is 256 megabytes ("MB"), where the entire amount of the address space that can be accessed by a 32 bit address is 4 GB.

In FIG. 4A, memory addresses in the processor 102 memory address space are directly mapped to a portion (the aperture area 402) of the APD memory 139. For the remainder of the APD memory 139, the processor 102 uses direct memory access ("DMA") communication using a fixed APD device function. For writes, direct memory access communication involves the processor 102 placing data to be written into system memory 104 (shown as "DMA staging"), and instructing the APD 116 to write that data to the APD memory 139 (shown as "DMA commands"). The APD 116 then reads the indicated data from the memory 104 into the APD memory 139 (shown as "DMA access"). In various examples, a DMA engine performs the operations of copying the data from the memory 104 into the APD memory 139 in response to the DMA commands. For reads, direct memory access communication involves the processor 102 setting aside a buffer in the memory 104 (DMA staging) and instructing the APD 116, via DMA commands, to write specified data into the buffer. The APD 116, then transmits the specified data to the memory 104 to be stored in the buffer (DMA accesses). In various examples, the DMA engine performs the operations of transmitting the data for storage into the memory 104. Note, the "non-aperture area 404" is the portion of the APD memory 139 that is accessed via the DMA mechanism.

In some examples, the DMA engine, which is not shown in FIG. 4A, is implemented as hard-wired circuitry configured to perform the stated functionality, software executing on a processor configured to perform the stated functionality, or a combination of hard-wired circuitry and software executing on a processor configured to perform the stated functionality.

The DMA-based access of the APD memory 139 is slower than a direct-mapped access because the DMA-based access requires multiple steps. For example, the DMA-based access requires the DMA staging to occur, the DMA commands to be issued, and finally, the DMA access to occur. By contrast, a direct-mapped access simply requires the processor 102 to execute instructions specifying a specific address in the memory address space of the processor 102.

For the above reason, it is desirable to have the mechanism that allows for direct-mapping-based access use a large address size, thus allowing a larger portion or all of the APD memory 139. In an example, an address size of 64 bits allows for access of 16 exabytes of data ($2^{64}$ bytes). Consequently, even a small portion of this amount of data—the portion that could be set aside for direct-mapping from the processor 102 address space to the APD 116 address space—would be sufficient to map all of the APD memory 139.

In order to operate with such a larger address size, the base address register of the APD 116 would be configured to store addresses corresponding to that larger size. In an example, the base address register would store a larger-sized (e.g., 64-bit) base address. Such a base address register would allow for storage of a mapping between an address of the processor 102 address space and an address of the APD memory 139, so that accesses to addresses that begin at the address of the processor 102 and extend by a certain range are mapped by the computer system 100 into the APD memory 139. In some examples, the entirety of the APD memory 139 is mapped to a portion of the processor 102 address space in this manner.

A base address register configured for a larger sized address (e.g., 64 bit) is incompatible with software and hardware that operates with a smaller sized address (e.g., 32 bit). Thus, an APD 116 with a base address register configured for a larger sized address is incompatible with certain hardware and software that is configured for a smaller address size. In an example, if a base address register is configured to operate with a 64-bit address, then a 32-bit operating system or a 32-bit processor would not function correctly with such a base address register.

For the above reasons, FIG. 4B illustrates an example APD 116 that includes a "small" BAR 452 and a "large" BAR 454. The small BAR 452 is configured to operate with smaller-sized addresses (such as 32 bit addresses) and the large BAR 454 is configured to operate with larger-sized addresses (such as 64 bit addresses). The small BAR 452 thus includes space for a 32-bit address to map a range of addresses of the processor 102 address space to at least a portion of the APD memory 139 (the aperture area 402). The large BAR 454 includes space for a 64-bit address to map a range of addresses of the processor 102 address space to a larger portion of the APD memory 139 than what is mapped for the small BAR 452. In FIG. 4B, this larger portion is the large aperture area 456, shown as larger than the small aperture area 451, which the small BAR 452 maps to. In examples, the large aperture area 456 is the entirety of the APD memory 139, almost the entirety of the APD memory 139 (e.g., some large percentage of the APD memory 139, such as a percentage in the 90's), or is a smaller portion of the APD memory 139 that is larger than the small aperture area 451. In an example, the small aperture area 451 is 256 MB and the large aperture area 456 is at least 1 GB.

It should be understood that the APD 116 of FIG. 4B includes both a small BAR 452 and a large BAR 454 that operate as described herein. One advantage of including both BARs in a device is so that a single such device could be used with many different computer systems, regardless of whether such computer systems support a particular type of addressing.

Figure 5A:
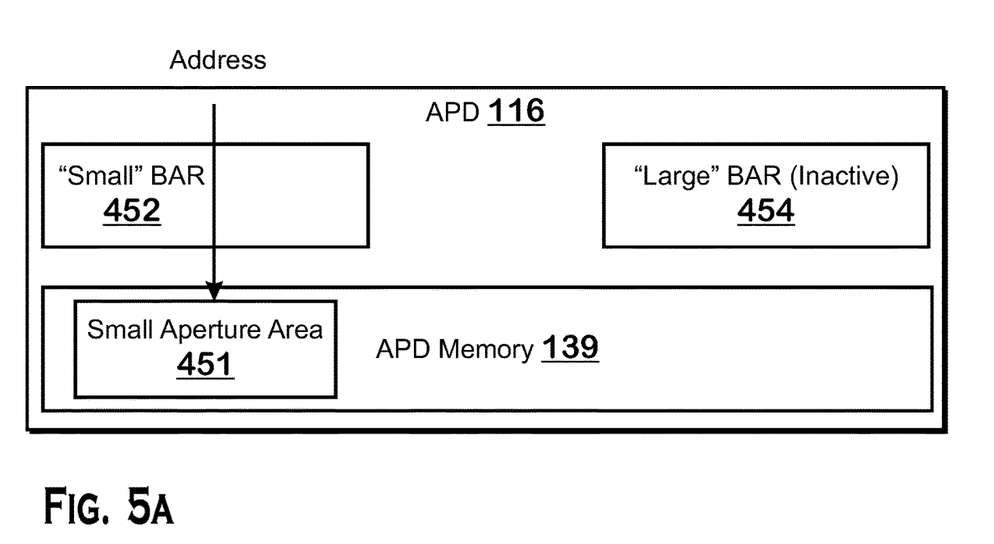
FIGS. 5A-5D illustrate several techniques for using one or both base address registers of an accelerated processing device to access accelerated processing device memory, according to examples.

FIGS. 5A-5D illustrate several techniques for using one or both BARs of an APD 116 to access APD memory 139, according to examples. In FIG. 5A, the small BAR 452 of the APD 116 is enabled and the large BAR 454 is disabled. In this configuration, direct-mapped access of the APD memory 139 occurs via the smaller address space and address size associated with the small BAR 452. For this reason, the direct-mapped accesses occur to the small aperture area 451, with the large aperture area 456 (not shown in FIG. 5A) being inaccessible through the direct-mapped memory mapping mechanism. In this configuration, access to the non-aperture area 404 occurs through the direct memory access mechanism as described elsewhere herein.

In various examples, this configuration is used where a computer system (e.g., computer device 100) that includes the APD 116 does not have the capabilities to access memory using an address having a size corresponding to the large BAR 454 (e.g., 64 bits), or where the computer system is not configured to access memory using an address having a size corresponding to the large BAR 454.

Figure 5B:
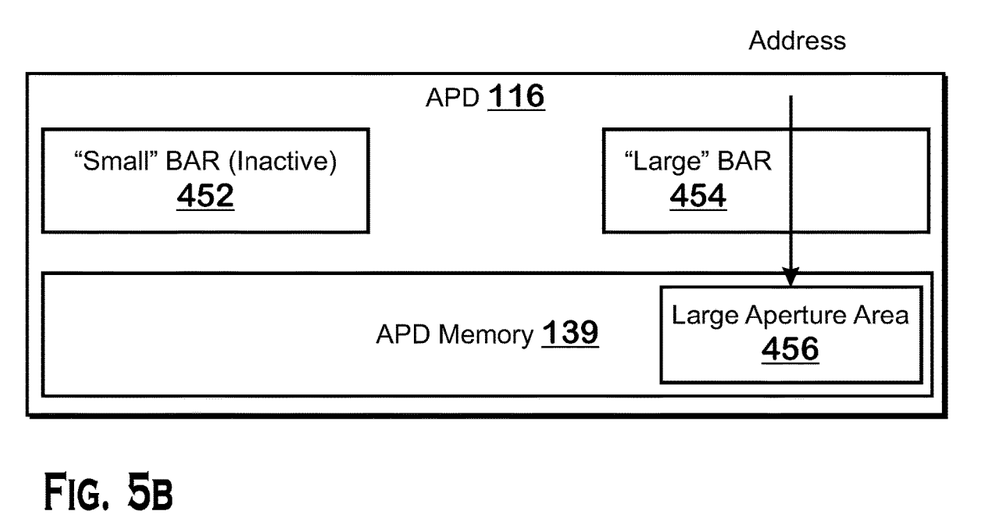

FIG. 5B illustrates a configuration in which the large BAR 454 is enabled and the small BAR 452 is inactive. In this configuration, the processor 102 accesses the APD memory 139 in a direct mapped manner through the large BAR 454, but not through the small BAR 452. If there is a non-aperture area 404 in the APD memory 139, then the processor 102 accesses that portion of the APD memory 139 through the DMA mechanism described elsewhere herein.

In various examples, this configuration is used where a computer system (e.g., computer device 100) that includes the APD 116 has the capabilities to access memory using an address having a size corresponding to the large BAR 454 (e.g., 64 bits).

Figure 5C:
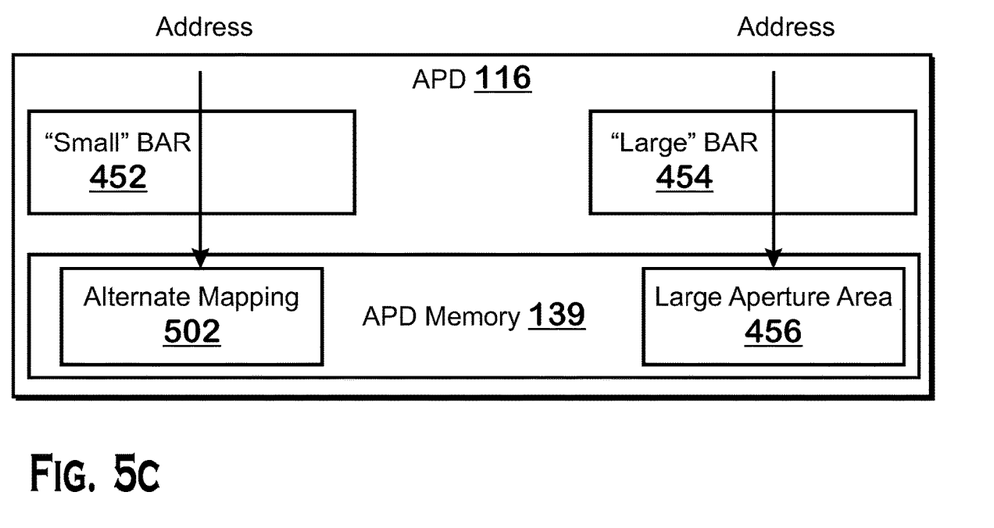

FIG. 5C illustrates a configuration in which both the small BAR 452 and the large BAR 454 are available for the processor 102. In this configuration, the processor 102 accesses the large aperture area via the large BAR 454 as described elsewhere herein. In addition, the small BAR 452 provides the processor 102 with an alternative mapping 502 to at least a portion of the APD memory 139.

In one example, the alternative mapping 502 is simply a mapping to a different portion of the APD memory 139 than what the large BAR 454 maps to. In other words, in this example, the small BAR 452 and the large BAR 454 are accessible at the same time, and the small aperture area 451 is a different portion of the APD memory 139 than the large aperture area 456.

In other examples, the alternative mapping 502 is a memory address mapping that is qualitatively different than the mapping between the processor 102 address space and the APD memory 139 address space using the large BAR 454. More specifically, the mapping using the small BAR 452 in FIG. 5C does not occur linearly. In other words, it is not necessarily the case that the mapping using the small BAR 452 occurs in such a manner that a numerical increase in the address in the processor 102 address space is mapped to the same numerical increase in the address in the APD memory 139 address space. In other words, it is not necessarily the case that an address that is an offset above the base address in the processor 102 address space is mapped by the small BAR 452 to the same offset above the base address in the APD memory 139 address space. Instead, mapping via the small BAR 452 occurs in a non-linear manner.

In an example, mapping using the small BAR 452 occurs in a tiled manner. More specifically, it is sometimes advantageous in the APD 116 to access the frame buffer—the buffer into which the results from the graphics processing pipeline 134 are written—in a tiled manner. Accessing the frame buffer in a tiled manner means accessing a tile of the frame buffer together in time. A "tile" is a portion of the frame buffer whose width or height, or both width and height, is smaller than the width or height of the frame buffer, respectively. In an example, a tile is a subset of all rows of the frame buffer, a subset of all columns of the frame buffer, or a rectangular or square portion of the frame buffer that is smaller in both width and height than the frame buffer. Accessing the contents of a tile together in time means first accessing the pixels of one tile before accessing the pixels of another tile. Tiled access can provide benefits such as improved cache utilization, since a smaller portion of the frame buffer, which is more likely to fit in a cache, is accessed.

Although tiled access as described above provides benefits, performing tiled accesses can be complicated in terms of address selection. For example, when a row of a tile is complete, proceeding to the next row requires adding an amount to the address equal to the width of the frame buffer and subtracting the width of the tile. Thus in an example, the mapping provided by the small BAR 452 provides a more linear access to tiles while the large BAR provides a tiled access to the same physical memory. In an example, linear access to a tile involves mapping addresses in the processor 102 address space to the tiled APD address space in such a way that, within a tile, an increment to an address at the end of a row maps to the first pixel of the next row of the tile. This action results in the entire tile being linearly addressable in the processor 102 address space. In addition, the linear access involves in response to an increment to an address at the end of a tile (e.g., the bottom-right pixel of a tile), that address is mapped to the first pixel (e.g., the top-left pixel) of the next tile. To implement this type of mapping, in response to the APD 116 receiving an address at the small BAR 452, the APD 116 converts that address to an address in this tiled address space. Each tile-sized block of the processor 102 address space is mapped to a tile in the APD 116 address space. The tile-sized blocks are consecutive in the processor 102 address space.

Figure 5D:
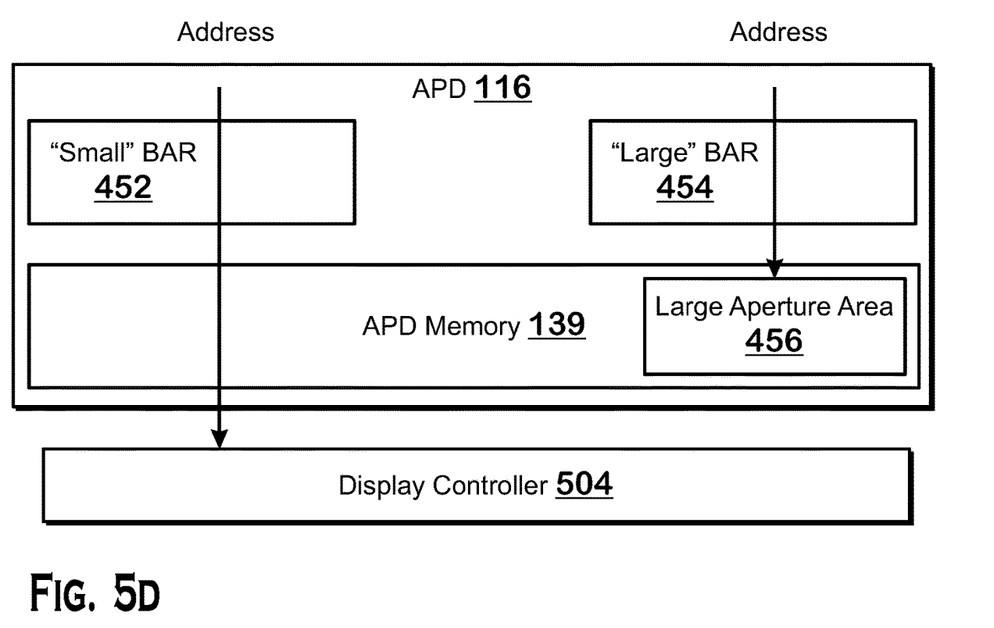

FIG. 5D is an illustration of another example configuration for utilizing the small BAR 452 and large BAR 454. In this example, the large BAR 454 maps into the large aperture area 456 of the APD memory 139 and that the small BAR 452 maps into a display controller 504. The display controller 504 reads the contents of the frame buffer and transmits image information to the display device for display. The display controller 504 is, in various examples, implemented as hard-wired circuitry that is configured to perform the functionality described herein, software executing on a processor that is configured to perform the functionality described herein, or a combination of software executing on a processor and hard-wired circuitry is configured to perform the functionality described herein.

Controlling the display controller 504 via the small BAR 452 means sending commands to the display controller 504 or reading or writing configuration information to the display controller 504 via he small BAR 452. That these commands or configuration information are transmitted via the small BAR 452 means that the APD 116 maps addresses in the processor 102 address space that fall within the range assigned to the small BAR 452 to the display controller 504. More specifically, in response to the APD 116 receiving an address that maps to that range, the APD 116 transmits the specified commands or configuration information to the display controller 504. In some examples, the APD 116 maps at least some specific addresses within the range to specific functions of the display controller 504, so that in response to the processor 102 accessing such addresses, the APD 116 accesses the associated specific commands or configuration information.

As stated above, the present disclosure contemplates implementations of the APD 116 that includes both of the small BAR 452 and the large BAR 454 and associated functionality. In addition, the present disclosure contemplates implementations of the APD 116 that are capable of performing any combination of the configurations of FIGS. 5A-5D. In various examples, the present disclosure contemplates implementations of the APD 116 that perform the configurations of FIGS. 5A and 5B or implementations that perform the configurations of 5A-5C, or implementations that perform the configurations of 5A-5D. In other examples, the present disclosure contemplates implementations of the APD 116 that perform the configurations of FIG. 5B and 5C, the configurations of 5B and 5D, the configurations of 5B-5C, or the configurations of 5C and 5D. In various examples, one or more control elements, such as an operating system or basic input output system ("BIOS") or functional equivalent controls the APD 116 to switch between the different configurations of FIGS. 5A-5C. In addition, such control elements configure the small BAR 452 and large BAR 454 with the appropriate information such as the mapping between the processor 102 address space and the APD 116 address space.

Some example computing systems and corresponding sequences of operation for the APD 116 are now provided. In one example computing system, the firmware (e.g., BIOS or unified extensible firmware interface—"UEFI") operates with an address size corresponding to the small BAR 452 (e.g., is 32 bit firmware, or UEFI with compatibility support mode ("CSM")). In addition, the operating system operates with either that address size or the larger address size corresponding to the large BAR 454. In this scenario, the firmware operates the APD 116 in the configuration of FIG. 5A, where the small BAR 452 is active and the large BAR 454 is inactive. In response to the operating system becoming active, the operating system either maintains the APD 116 in that configuration or, if the operating system is capable of operating with the large address size, reconfigures the APD 116 to operate in the configuration of FIG. 5B, in which the small BAR 452 is inactive and the large BAR 454 is inactive.

In another example, a portion of the APD 116 that displays graphics of the firmware during boot operates in a small address mode, but the operating system operates in the large address mode. An example of such a portion of an APD 116 is the VESA BIOS extensions standard (where VESA is the "Video Electronics Standards Association"). In this scenario, the firmware uses the small BAR 452 for the POST ("power on self test") screen or other graphics for boot-up. The firmware is permitted to access the large BAR 454, including to initialize the large BAR 454, but does not necessarily access the large BAR 454. The operating system, upon being initialized, accesses the APD 116 via the large BAR 454.

In yet another example, the firmware, bootloader (including graphical component), and operating system are all capable of operating with the large size address (associated with the large BAR 454). In this situation, the firmware and operating system access the APD 116 via the large BAR 454.

In some implementations, the different BARs—the small BAR 452 and the large BAR 454—are associated with different peripheral component interconnect express ("PCIe") functions. A function is an addressing mechanism that facilitates targeting of specific transactions in a specific manner for PCIe devices. For memory-mapped addressing, as occurs with the small BAR 452 and large BAR 454, a PCIe controller (not shown) checks the memory address in the processor 102 address space and identifies which PCIe function is associated with that address. The PCIe controller selects one of the base address registers based on the function and provides this selection to the APD 116. The APD 116 converts the address in the processor 102 memory address space to an address in the APD 116 memory address space based on the selected base address register.

Although a base address register is described as the mechanism for mapping addresses in the processor 102 address space to addresses in the APD 116 address space, any technically feasible mechanism for performing such mapping falls within the scope of the present disclosure. In general, such a mechanism is referred to herein as a direct-mapping unit, and is a hard-wired circuit configured to perform the mapping, software executing on a processor configured to perform the mapping, or combination of such hardware and software.

Figure 6:
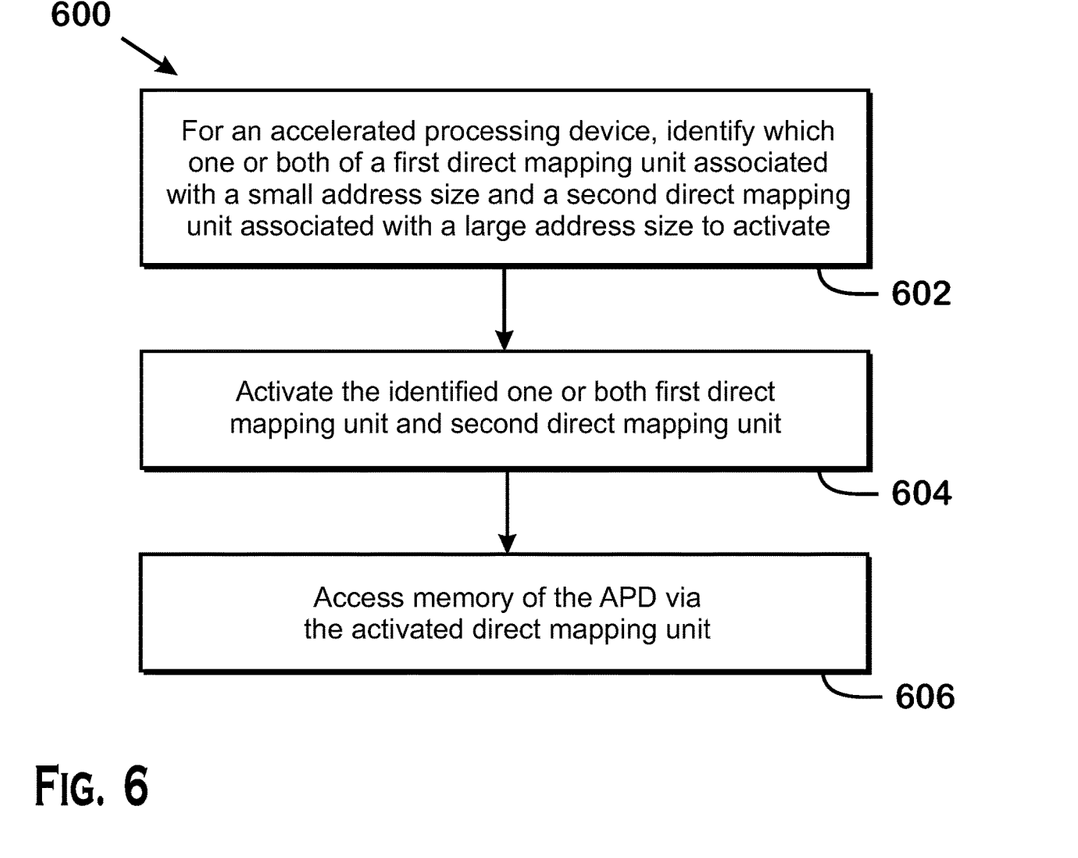
FIG. 6 is a flow diagram of a method for accessing memory of an accelerated processing device, according to an example.

FIG. 6 is a flow diagram of a method 600 for accessing memory of an APD 116, according to an example. Although described with respect to the system of FIGS. 1-5D, those of skill in the art will understand that any system, configured to perform the steps of the method 600 falls within the scope of the present disclosure.

The method 600 begins at step 602, where a firmware (such as a BIOS or UEFI) or an operating system identifies which direct-mapping unit (e.g., which BAR, such as the small BAR 452 or the large BAR 454) to activate for accessing APD memory 139. As described elsewhere herein, the small BAR 452 is associated with a small address size (such as 32 bits) and maps small addresses in the processor 102 address space to a small aperture in the APD memory 139. The large BAR 454 is associated with a large address size (such as 64 bits) and maps large addresses in the processor 102 address space to a large aperture in the APD memory 139. The firmware or operating system determines which direct-mapping unit to use based on whether the firmware or operating system is capable of addressing via small or large addresses. If the firmware is not capable of addressing via large addresses, then the firmware selects the small direct-mapping unit to use. If the firmware is capable of addressing via large addresses, then the firmware selects the large direct-mapping unit to use. Similarly, if the operating system is capable of addressing via large addresses, then the operating system selects the large direct-mapping unit to use. If the operating system is not capable of addressing via large addresses, then the operating system selects the small direct-mapping unit to use. In some implementations, if the operating system or firmware selects the large direct-mapping unit to use, then the operating system also selects the small direct-mapping unit to use for an alternate purpose, such as to map into a different aperture area than the large direct-mapping unit, to map into the APD memory 139 in a non-linear manner (such as in a tiled manner) or to map into a display controller.

At step 604, the firmware or operating system activates the identified one or both first direct mapping unit and second direct mapping unit. In some implementations, activating these units means writing the appropriate mapping information into these units to allow these units to map addresses of the processor 102 address space into the APD 116 address space.

At step 606, the processor 102 accesses the APD memory 139 utilizing the activated one or both direct mapping units. This accessing includes the APD 116 receiving an access request to a memory address in the processor 102 address space, the APD 116 converting that address to the APD 116 address space, and the APD 116 performing the requested access.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be mask works that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for accessing accelerated processing device ("APD") memory, the method comprising: for a first set of memory addresses provided via a small address base address register of the APD, mapping the first set of memory addresses to a first portion of a memory of the APD in a tiled manner, wherein the small address base address register is configured to be accessed with addresses of a first size; accessing the memory of the APD according to the first mapping and the first set of memory addresses, wherein the accessing includes accessing in the tiled manner, in which a first address of the first set of memory addresses maps to an end of a tile in the memory of the APD and in which a second address immediately subsequent to the first address maps to a beginning of the tile; for a second set of memory addresses provided via a large address base address register of the APD, mapping the second set of memory addresses to a second portion of the memory of the APD, wherein the second portion is larger than the first portion, wherein the large address base address register is configured to be accessed with addresses of a second size that is larger than the first size; and accessing the memory of the APD according to the second mapping and the second set of memory addresses.

2. The method of claim 1, wherein accessing the memory of the APD comprises converting an address of an address space of a processor that is external to the APD into an address space of the APD, as specified by the first mapping and the second mapping.

3. The method of claim 1, further comprising determining when to access the memory according to the first mapping or the second mapping is performed based on determining whether a firmware or an operating system is capable of operating according to the large address size.

4. The method of claim 3, further comprising: in response to determining that the firmware or the operating system are capable of operating according to the large address size, mapping the second set of memory addresses to the second portion of the memory of the APD.

5. The method of claim 3, further comprising: in response to determining that the firmware or the operating system are not capable of operating according to the large address size, mapping the first set of memory addresses to the first portion of a memory of the APD.

6. A computing device, comprising: one or more memories configured to store instructions; and a processor configured to execute the instructions to access accelerated processing device ("APD") memory, by: for a first set of memory addresses provided via a small address base address register of the APD, map the first set of memory addresses to a first portion of a memory of the APD in a tiled manner, wherein the small address base address register is configured to be accessed with addresses of a first size; access the memory of the APD according to the first mapping and the first set of memory addresses, wherein the accessing includes accessing in the tiled manner, in which a first address of the first set of memory addresses maps to an end of a tile in the memory of the APD and in which a second address immediately subsequent to the first address maps to a beginning of the tile; for a second set of memory addresses provided via a large address base address register of the APD, map the second set of memory addresses to a second portion of the memory of the APD, wherein the second portion is larger than the first portion, wherein the large address base address register is configured to be accessed with addresses of a second size that is larger than the first size; and access the memory of the APD according to the second mapping and the second set of memory addresses.

7. The computing device of claim 6, wherein accessing the memory of the APD comprises converting an address of an address space of a processor that is external to the APD into an address space of the APD, as specified by the first mapping and the second mapping.

8. The computing device of claim 6, wherein the processor is further configured to determining when to access the memory according to the first mapping or the second mapping is performed based on determining whether a firmware or an operating system is capable of operating according to the large address size.

9. The computing device of claim 8, wherein the instructions further cause the processor to: in response to determining that the firmware or the operating system are capable of operating according to the large address size, map the second set of memory addresses to the second portion of the memory of the APD.

10. The computing device of claim 8, wherein the instructions further cause the processor to: in response to determining that the firmware or the operating system are not capable of operating according to the large address size, map the first set of memory addresses to the first portion of a memory of the APD.

11. A non-transitory computer-readable medium storing instructions that, when executed by a processor, cause the processor to perform operations comprising: for a first set of memory addresses provided via a small address base address register of an accelerated processing device ("APD"), map the first set of memory addresses to a first portion of a memory of the APD in a tiled manner, wherein the small address base address register is configured to be accessed with addresses of a first size; access the memory of the APD according to the first mapping and the first set of memory addresses, wherein the accessing includes accessing in the tiled manner, in which a first address of the first set of memory addresses maps to an end of a tile in the memory of the APD and in which a second address immediately subsequent to the first address maps to a beginning of the tile; for a second set of memory addresses provided via a large address base address register of the APD, map the second set of memory addresses to a second portion of the memory of the APD, wherein the second portion is larger than the first portion, wherein the large address base address register is configured to be accessed with addresses of a second size that is larger than the first size; and access the memory of the APD according to the second mapping and the second set of memory addresses.

12. The non-transitory computer-readable medium of claim 11, wherein accessing the memory of the APD comprises converting an address of an address pace of a processor that is external to the APD into an address space of the APD, as specified by the first mapping and the second mapping.

13. The method of claim 1, wherein the first portion of the memory of the APD is included within the second portion of the memory.

14. The method of claim 1, wherein the second portion of the memory includes a non-aperture area accessed via a direct memory access mechanism.

15. The method of claim 1, wherein the first set of memory addresses are smaller than the second set of memory addresses.

16. The method of claim 1, wherein the mapping the first set of memory addresses to the first portion, the accessing the memory of the APD according to the first mapping, the mapping the second set of memory addresses to the second portion, and the accessing the memory of the APD according to the second mapping occurs in an overlapping time period.

17. The computing device of claim 6, wherein the first portion of the memory of the APD is included within the second portion of the memory.

18. The computing device of claim 6, wherein the second portion of the memory includes a non-aperture area accessed via a direct memory access mechanism.

19. The computing device of claim 6, wherein the first set of memory addresses are smaller than the second set of memory addresses.

20. The computing device of claim 6, wherein the mapping the first set of memory addresses to the first portion, the accessing the memory of the APD according to the first mapping, the mapping the second set of memory addresses to the second portion, and the accessing the memory of the APD according to the second mapping occurs in an overlapping time period.

* * * * *